United States Patent [19]
Nogier et al.

[11] 3,874,382
[45] Apr. 1, 1975

[54] SEALING PISTON CAP FOR HYPODERMIC INJECTION SYRINGE

[76] Inventors: Louis Nogier, 11 Quai Claude Bernard, 69007 Lyon, France; Paul Nogier, 108, rue du Dr. Edmond Locard, 69005 Lyon, France

[22] Filed: Apr. 2, 1973

[21] Appl. No.: 347,325

[52] U.S. Cl. ............... 128/218 P, 128/234, 92/249, 92/245
[51] Int. Cl. .............................................. A61m 5/18
[58] Field of Search ................. 277/212 R, 212 C; 128/218 P; 92/249, 245

[56] References Cited
UNITED STATES PATENTS

| | | | |
|---|---|---|---|
| 2,895,773 | 7/1959 | McConnaughey | 128/218 P |
| 3,147,753 | 9/1964 | Nogier et al | 128/218 P |

FOREIGN PATENTS OR APPLICATIONS

| | | | |
|---|---|---|---|
| 1,500,009 | 9/1967 | France | 128/218 P |

*Primary Examiner*—Samuel B. Rothberg
*Attorney, Agent, or Firm*—Bacon & Thomas

[57] ABSTRACT

The invention relates to a sealing piston cap made of rubber for a hypodermic injection syringe, the piston cap making it possible to obtain automatic sealing during suction and compression. It comprises, around its cylindrical skirt and outwardly thereof, a single circular sealing ring and, inwardly thereof, a bead for mounting it at the end of the piston, the bead being forwardly of an annular groove located in line with the outer sealing ring to reduce the thickness of the joint skirt. The forward bottom wall of the piston cap, in contact with the liquid to be injected, is completely convex and smooth.

5 Claims, 2 Drawing Figures

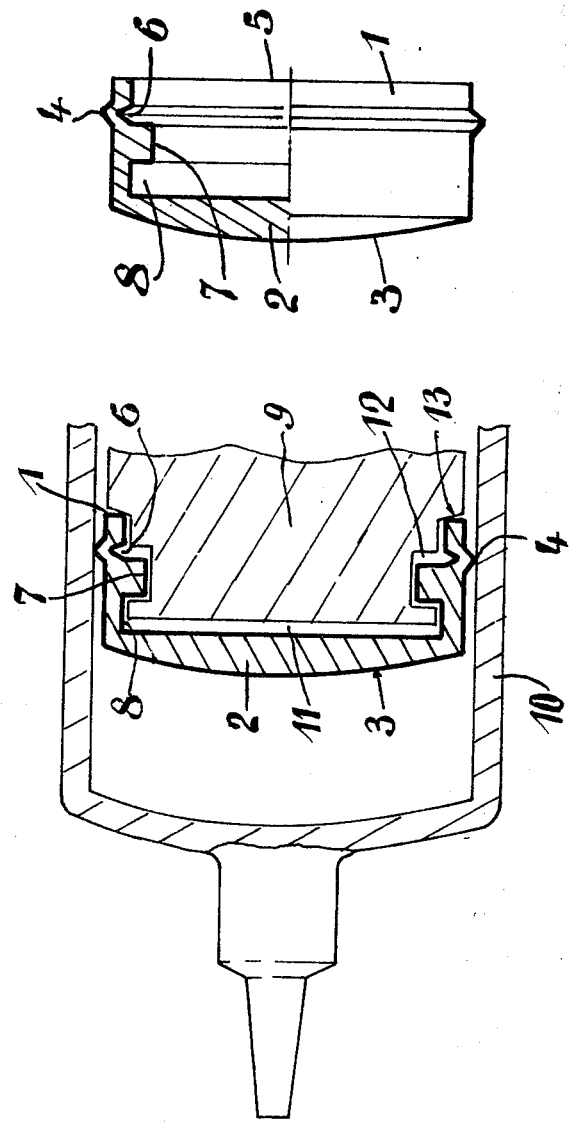

SEALING PISTON CAP FOR HYPODERMIC INJECTION SYRINGE

The present invention relates to a new rubber sealing cap for the piston of a hypodermic injection syringe provided with self-sealing during suction and compression, having a simple shape easy to mold and being easily mountable on the head of a piston.

In order to obtain a proper sealing cap for syringes made of plastics materials, a certain number of objects must be provided such as:

smoothness in sliding displacement even after an extended stay in water, even after several sterilizations in boiling water or in an autoclave;

perfect sealing during suction creating light or strong vacuum or at rest;

perfect sealing during compression creating high, medium or low pressures;

clearance of the cap that must easily adapt itself to light variations in the dimensions of the cylinder due either to an ovalization or even to deformations subsequent to contraction or expansion;

perfect mounting of the cap on the piston which must not jam in the body of the syringe, either when being inserted or during its displacement, nor pull out when the piston is suddenly pulled even under unfavorable conditions such as when the syringe is dry;

ease in positioning it at the end of the piston during assembly;

complete convexity without ruggedness of its forward face in contact with the injection liquid to facilitate cleaning and, subsequently, sterilization;

a single contact sealing ring to lower friction and also to prevent, in certain circumstances, the possible formation of a depressed air chamber between two sealing rings causing additional difficulty in displacing the piston;

sturdiness in order to obtain a long useful life;

a shape which is not too complicated to facilitate molding and thus avoid the formation of faults during molding.

The caps proposed in French Pat. Nos. 974,009; 1,048,267; 1,108,413 and 1,288,146 give satisfaction on many points but not perfectly on all, particularly in the first models, perfect sealing is not completely ensured in all circumstances, particularly when the piston is at rest; only the caps corresponding to French Pat. No. 1,288,146 have a good sealing even with the piston of the syringe at rest.

The last cap also offers positive advantages with respect to prior caps because of its convex shape and the absence of roughness in contact with the liquid to be injected which facilitates cleaning and sterilization.

However, it retains a certain number of disadvantages that are sufficiently important to be embarrassing, particularly its very complex shape which renders its molding very difficult causing an important quantity of parts that have to be scrapped.

On the other hand, its mounting at the end of a piston is difficult and requires several successive operations necessitating a certain effort even for someone skilled.

Finally, in certain cases (strong suction in a dry syringe) holding of the joint at the tip of the piston becomes insufficient and the cap sometimes becomes jammed at the bottom of the syringe.

The new cap, object of the present invention, retains the advantages of the preceding caps but acquires the three qualities that lack in the latter and in the best of the caps described in French Pat. No. 1,288,146, that is:

1. a simple shape making the molding of the cap easy and thus allowing practically a total absence of scrapped parts during manufacture;
2. the mounting of the new cap at the tip of the piston is accomplished with extreme ease and almost without effort;
3. coupling of the new cap at the tip of the piston is reverse that of caps of the aforementioned patent, having great sturdiness and safety, so much so that even in very unfavorable conditions (dry syringe, quick suction drawing) the cap remains perfectly coupled to the tip of the piston.

A better idea of the invention will be afforded by the description that follows of a preferred embodiment of a cap made according to the present invention, the description having reference to the appended drawings wherein:

FIG. 1 is a cross-sectional view of the forward part of a hypodermic syringe of which the piston is provided with a cap as aforesaid, FIG. 2 is a side elevational view, half in cross-section, illustrating the sealing cap alone.

As shown in the drawing, the sealing cap comprises a skirt 1 closed at one end by a forward bottom wall 2 of which the outer face 3 in contact with the liquid is convex and without roughness. The bottom wall 2 has an appreciable thickness that makes it possible to transmit the pressure of the liquid on the skirt 1 of the sealing cap.

Outwardly, the skirt 1 is provided with a single circular sealing ring 4 located near the opening 5 of the cap. Inwardly and in line with the ring 4 there is provided an annular hollow or groove 6 which thins the cap skirt 1.

Forwardly of the ring 4 and of the groove 6, the skirt 1 inwardly forms an annular bead 7 forwardly of which is provided a circular mounting or coupling channel 8 located immediately behind the forward wall 2.

The enlarged tip of the piston 9 of the syringe 10 bears against the bead 7 which is bulky to give this bearing rim (FIG. 2) great strength. The shape of the head of the piston 9 follows the inner contour of the cap with a certain clearance which is greatest at its forward part 11, as well as at 12 at the level of the annular groove 6, but with a reduced clearance everywhere else. These clearances are useful, the first ones to allow the rubber to deform under pressure forces, the second ones to prevent the cap from getting jammed between the wall of the cylinder and the head of the piston during possible light expansion of the synthetic rubber of the sealing cap.

The reduced diameter portion of the piston joins the remaining cylindrical portion of larger diameter by a shoulder making a slight slope (10° to 15°) that facilitates sealing of the cap when used under compression. This sloping shoulder is designated, in FIG. 1, by the numeral 13.

The new cap as described offers self-sealing qualities during compression as well as during suction, that is its sealing feature automatically adapts itself to overpressure or underpressure to which it is subjected. This feature makes it possible to obtain a very smooth sliding displacement when the forces exerted on the liquid are small; indeed, during that time the force of the sealing ring 4 on the wall of the cylinder 10 is reduced to a minimum; it has voluntarily been made small at rest, but nevertheless sufficient to prevent the liquid from flowing out.

Under all force conditions, be it compression or suction, the pressure of the sealing ring 4 over the wall of the cylinder 10 automatically increases in proportion to the pressure of the liquid on the cap because of its very special shape. Indeed, under compression forces, the cap 1 bends upon itself at the level of the sealing ring by pushing the latter ring outwardly and this more so as the pressure increases; the slight inclined slope 13 of the piston over which the circular edge of the cap bears helps the cap skirt to rock outwardly and thus increases sealingability.

Under suction or pulling forces, a double action takes place that increases sealingability:

1. the depression existing inside the body of the syringe tends to force the wall of the cap 1 against the wall of the cylinder 10;
2. the pull of the piston 9 on the inward edge of the coupling bead 7 of the cap tends to cause rocking of the said bead toward the opening 5 and thus tends to cause spreading of the cap at the level of the sealing ring 4.

This double action participates in ensuring perfect sealing of the joint under all types of depressions, small or large. Furthermore, because of the clearance that exists between the cap and the piston head, sealing remains excellent even when there is produced accidentally either a slight ovalization of the body of the syringe or light oblique oscillations of the piston in the body of the syringe.

We claim:

1. In a syringe having a cylinder, a piston slidable therein and a resilient sealing cap on said piston, the improvements comprising:

said sealing cap being of generally cup shape, having an end wall extending across the end of said piston and a single skirt portion extending loosely between said piston and cylinder;

an integral annular sealing ring extending circumferentially around said skirt in sliding engagement with said cylinder, said sealing ring being in the form of a thin-walled rib and defining and annular groove at the inner side of said skirt; and a solid annular rib, integral with said skirt on the inner surface of said skirt between said sealing ring and said end wall, said rib extending into an annular groove in said piston.

2. A syringe as defined in claim 1 wherein the end of said piston is spaced from said end wall whereby said piston transmits sliding movement to said cap only through said annular rib.

3. a syringe as defined in claim 1 wherein said piston is provided with an annular shoulder adjacent and facing the end of said skirt, said shoulder being inclined outwardly and away from said end of said skirt to engage and bias said skirt and sealing ring outwardly when said piston slides toward said end wall, said rib being of lesser axial dimension than said annular groove in said piston.

4. A syringe as defined in claim 3 wherein said shoulder is inclined at an angle of from 10° to 15°.

5. A syringe as defined in claim 2 wherein said end wall is spaced from the end of said piston and is sufficiently thick and rigid to resist flexure into contact with the end of said piston as a result of pressure in said syringe.

* * * * *